United States Patent [19]

Weinstein et al.

[11] 4,280,188

[45] Jul. 21, 1981

[54] SURVIVABLE REDUNDANT VECTOR SENSORS FOR SYSTEMS WITH DIFFERING MAXIMUM OUTPUT REQUIREMENTS

[75] Inventors: Warren D. Weinstein, Huntington Station; Jean A. Boudreau, Commack; Donald Gertz, Carle Place, all of N.Y.

[73] Assignee: Grumman Aerospace Corporation, Bethpage, N.Y.

[21] Appl. No.: 52,804

[22] Filed: Jun. 28, 1979

Related U.S. Application Data

[63] Continuation of Ser. No. 950,375, Oct. 11, 1978, abandoned, and a continuation of Ser. No. 594,955, Jul. 11, 1975, abandoned.

[51] Int. Cl.³ ...................... G06F 15/50; G01C 21/00
[52] U.S. Cl. ....................................... 364/566; 33/321; 73/178 R; 74/5.34; 364/453; 364/559
[58] Field of Search ............... 364/424, 434, 443, 453, 364/454, 566, 559; 33/318, 321, 322; 73/1 R, 1 E, 1 D, 178 R, 504; 244/3.2, 79, 191, 194, 165; 74/5.34, 5.37, 5.4; 318/648, 649

[56] References Cited

U.S. PATENT DOCUMENTS

| 3,428,789 | 2/1968 | Richard ........................... 364/559 |
| 3,489,004 | 1/1970 | Barnhill et al. ................... 33/321 X |
| 3,545,266 | 12/1970 | Wilson ............................ 364/453 X |
| 3,741,500 | 6/1973 | Liden ............................. 244/3.2 X |

OTHER PUBLICATIONS

GSFC Specification Inertial Reference Assembly for the International Ultraviolet Explorer Spacecraft–Goddard Space Flight Center, Greenbelt, Maryland–Mar. 1973.

Primary Examiner—Joseph F. Ruggiero
Attorney, Agent, or Firm—Morgan, Finnegan, Pine, Foley & Lee

[57] ABSTRACT

Six sensors are oriented to position their input axes on the surface of a cone. The cone angle is optimized to permit the use of sensors with identical range capacity despite the fact that the maximum input along each of the orthogonal axes differs.

The optimization of cone angle minimizes the average total error amplification due to skewing and change of sensor maximum rate capability to provide data closely approximating that derived from a non skewed, orthogonal, sensor array. The sensors may be gyroscope or accelerometer which are packaged in assemblies of two identical sensors each.

29 Claims, 16 Drawing Figures

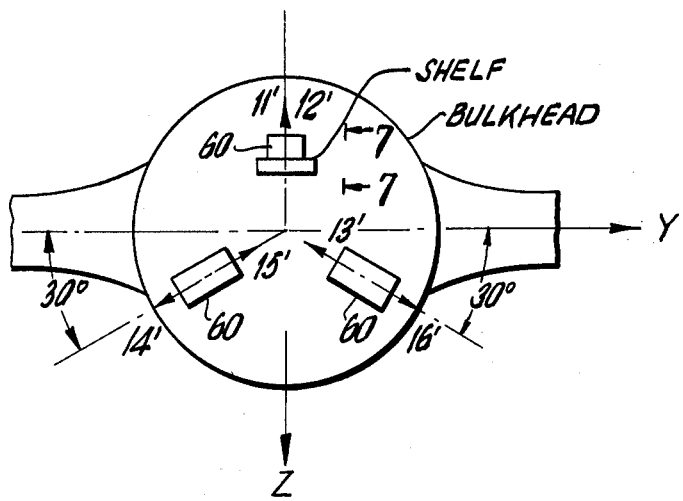
FIG.6
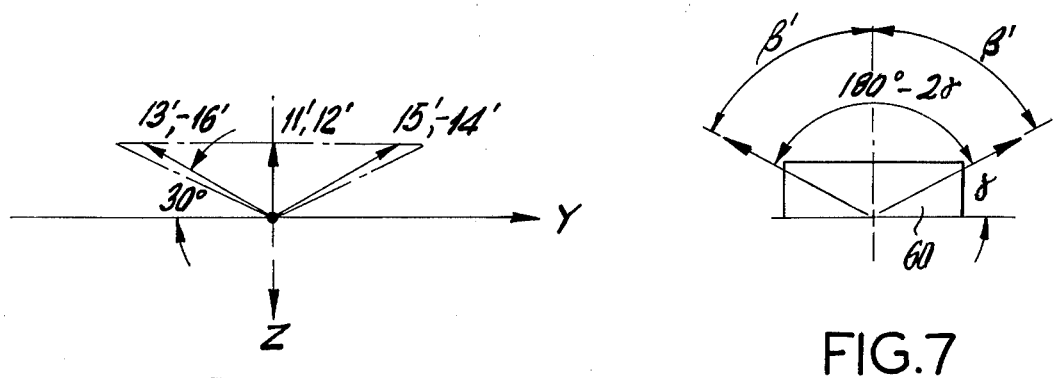
FIG.6a
FIG.7
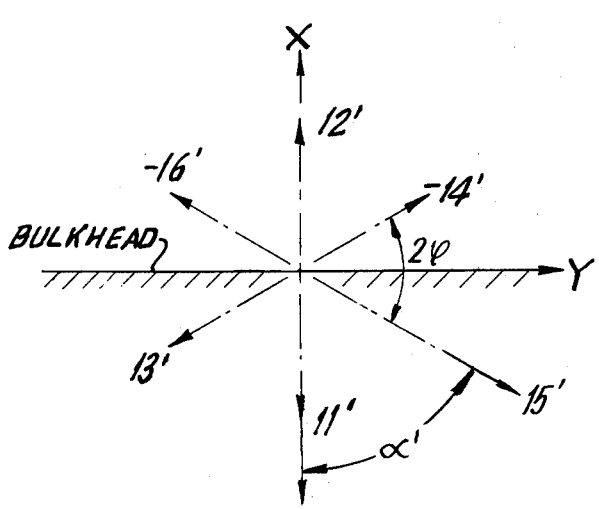
FIG.6c
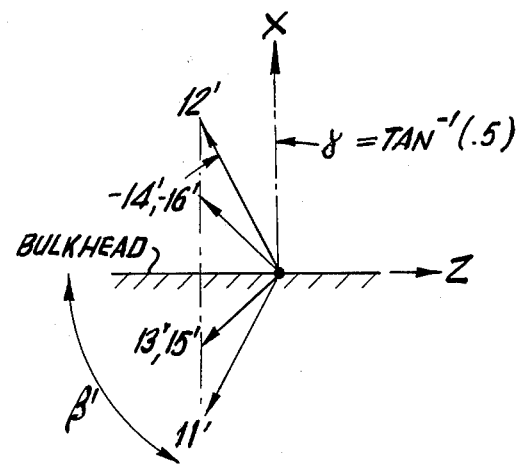
FIG.6b

SURVIVABLE REDUNDANT VECTOR SENSORS FOR SYSTEMS WITH DIFFERING MAXIMUM OUTPUT REQUIREMENTS

This is a continuation of application Ser. No. 950,375, filed Oct. 11, 1978, abandoned and a continuation of application Ser. No. 594,955, filed July 11, 1975, abandoned.

BACKGROUND OF THE INVENTION

This invention relates to improvements to redundant arrangements of sensors that measure physical quantities which may be represented by vectors. It also relates to the data management systems associated with these arrangements of sensors. The data management system portion of this invention accepts the signals to provide outputs that may be used to control the motion of a vehicle, such as an aircraft. Further, it provides malfunction detection and failure indication for the sensors.

Presently, aircraft and spacecraft with automatic flight control systems generally require reliable angular rate and translational acceleration information in three dimensions. Sensor systems containing redundant gyros and accelerometers, capable of operating satisfactorily after two component failures, are often provided to supply this information. In most cases where the vehicle maximum angular rate or translational acceleration requirement about one axis is different from the requirement about the other two axes, for example, maximum roll rate of 250°/sec; maximum pitch and yaw rate of 60°/sec; or maximum normal acceleration of 6 g's, and maximum lateral and longitudinal of 1 g, two different range gyros and accelerometers are used. To satisfy the redundancy and reliability requirements, multiple sensors of the same range with self contained electrical devices to detect sensor malfunctions are usually oriented with their sensitive axes (input axes) coaxial or "in-line" with one another. In cases where comparison monitoring for malfunction detection is also required, three or more sensors are provided. When comparison monitoring is employed, the output signal of each sensor is compared to the average of the outputs of the other two sensors. If the absolute value of the difference is greater than a fixed threshold, the sensor is considered failed.

Specifically, a two failure tolerant comparison monitoring malfunction detection requirement imposed on an aircraft rate gyro system has required large number of sensors, namely twelve of two different ranges. The sensors are arranged as follows: four of one range with their input axes coaxial with the aircraft roll axis and eight of a second range, four with their input axes coaxial with the aircraft pitch axis and four coaxial with the aircraft yaw axis.

Present comparison monitoring practices require that like sensors (e.g. roll gyros) be packaged on a rigid mounting surface in the vehicle so that structural vibration inputs to like sensors are the same. If like gyros are placed at different locations in the vehicle, the malfunction detection efficiency would be decreased because at different locations the structural vibration inputs to the sensors are dissimilar and change as a function of flight condition. The loss in efficiency results from the fact that the malfunction detection equations cannot distinguish between output signal differences due to sensor malfunctions and output signal differences due to dissimilar vibration inputs. In addition, it is desirable to locate sensors with respect to major structural bending nodes and antinodes of the vehicle. At the nodes and antinodes, the translational acceleration amplitude and the angular rate amplitude of vibration is minimized, respectively. Placement of sensors at or adjacent to these locations minimizes the need for output signal filtering. Output signal filtering and/or care in placement of the sensors is required to diminish regenerative interaction between the control system and structural bending. Regenerative interaction means that the control system in combination with the aircraft is unstable.

Unfortunately, these packaging and placement constraints, coupled with the multitude of sensors required to satisfy the redundancy needs, are inconsistent with the desirability of separating redundant sensors in spacecraft and aircraft to enhance the automatic control system equipment survivability. For example, in a combat situation, it is desirable to separate redundant components so that a single round of enemy fire does not destroy all components. Accordingly, it is an object of this invention to overcome and solve the packaging and sensor configuration problems.

In particular, it is an object of this invention to provide a configuration of sensors that satisfy the two failure tolerant/self-contained malfunction detection requirement and;

use the fewest number sensors use like range (duplicate) sensors provide a sensor system with improved malfunction detection capability, adequate output signal accuracy and an output signal replacement means that enhances system reliability provide a configuration of sensors that can be dispersed to meet survivability requirements without (1) degrading failure detection efficiency, or (2) imposing requirements for special data handling (filtering).

PRIOR ART

With the advancement of technology, particularly in the aerospace industry, various guidance and control systems utilizing redundant sensors have been proposed. Anderson, U.S. Pat. No. 3,269,179 discloses the use of six sensors configured with their input axes "in-line" with the vehicle axes.

Busher et al., U.S. Pat. No. 3,492,465, describes a skewed sensor system in which the sensors number one in excess of the axes under investigation to provide single failure redundancy. However, this disclosure does not address itself to the problems associated with differing maximum output requirements from the sensors and the use of single range sensors.

Weiss, U.S. Pat. No. 3,463,909 discloses the use of three orthogonal sensors skewed in relationship to the primary sensors to provide failure detection and isolation. This disclosure does not teach the use of the identical sensors to measure different maximum inputs or the optimization of sensor orientation for minimum error amplification due to skewing.

Boskovich et al., U.S. Pat. No. 3,403,874 discloses a particular skewed sensor configuration with failure detection and isolation. Howard, U.S. Pat. No. 3,374,966 describes a system for removing bending inputs from sensors.

SUMMARY OF THE INVENTION

The present invention utilizes a conical array of six identical vector sensors, either gyroscopes or accelerometers, whose input axes lie on a cone. The cone is selected to have a central half angle which minimizes the average total error amplification. The conical arrangement of sensors permits the use of sensors having identical maximum measurement capacities even though the maximum inputs at the yaw, pitch and roll axes differ.

Preferably, the sensors are packaged in packs of two sensors each which may be mounted in the aircraft for survivability at separated locations on a common bulkhead.

The two packs of gyro sensors are preferably positioned on a bulkhead located aft of the antinode of the first vibration mode of the aircraft to minimize vibration effects, and the axis of the cone formed by the sensor input axes is parallel to one of the roll, pitch or yaw axes.

DESCRIPTION OF THE DRAWINGS

FIG. 6 is a schematic sectional view of an alternative conical sensor configuration in accordance with the present invention utilizing accelerometers;

FIGS. 6a, 6b and 6c are views along the X, Y and Z axes, respectively of the accelerometer configuration of FIG. 6;

FIG. 7 is a schematic cross-sectional view of the accelerometer package (two-pack) taken along line 7—7 in FIG. 6;

Figure 1:
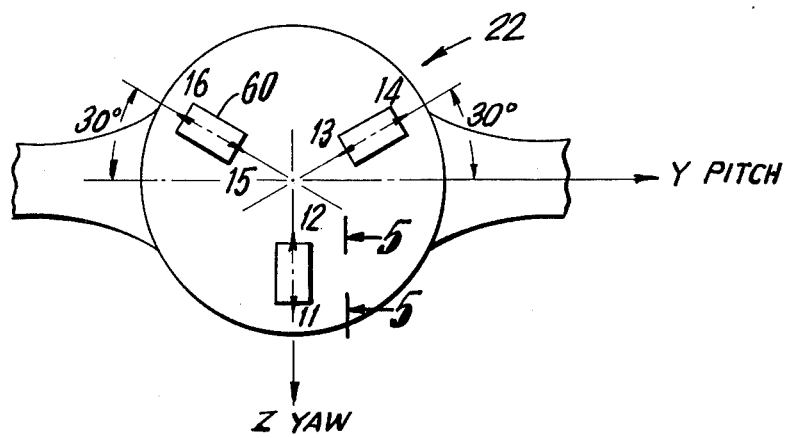
FIG. 1 is a schematic sectional view of an aircraft having a conical configuration of gyro sensors in accordance with the present invention and illustrating the orientation of the gyro input axes.

While this invention is susceptible of embodiment in many different forms, there is shown in the drawings and will hereinafter be described in detail a preferred embodiment of the invention and modifications thereto, with the understanding that the present disclosure is to be considered as an exemplification of the principles of the invention and is not intended to limit the invention to the embodiment illustrated.

Recent analyses and hardware implementation studies have shown that redundant rate sensing systems can be synthesized in an optimum fashion by orienting the input axes of the sensors in a non-orthogonal relationship with respect to one another. These systems require fewer components than the conventional coaxial (or in-line) redundancy approach, where all the sensor input axes are in line with each other. For a discussion of these studies, see C. R. Abrams & W. D. Weinstein, New Concepts For Angular Rate Flight Control Sensors, A.I.A.A. Mechanics and Control of Flight Conference, Paper No. 74-868, presented Aug. 7, 1974.

The vast majority of these recent studies have been directed towards synthesizing accurate inertial measurement units where precise performance, rather than developing the least costly configuration, was the key element in the design. The present invention, on the other hand, is directed towards using less costly components and configuring the systems of skewed sensors so that they meet the survivability requirements of an advanced fighter/attack aircraft. FIG. 1 illustrates this type of unique configuration, applied to automatic flight control system rate gyros. It satisfies a dual-fail operational redundancy requirement, and in addition, it implements an important new approach to sensor system design. This approach calls for the use of totally interchangeable "two-packs" of rate sensors that simultaneously satisfies the survivability requirement;

significantly reduces the number of spare gyros required;

minimizes the number of accurate gyro mounting surfaces needed in an aircraft;

allows all the angular rate sensors to be interchanged even though the yaw, pitch and roll maximum rates differ, for example, by a factor of five;

allows the rate sensor errors, reflected into roll, pitch and yaw rate calculations to be approximately equivalent to the errors expected from an orthogonal sensor system.

minimizes maintenance, repair and logistics

In FIG. 1, the system is composed of six gyro sensors G. The gyros have their input axis lying along vectors 11, 12, 13, 14, 15, and 16 respectively. The gyros are contained in packages 60, of two gyros each, as described in greater detail below. Each package 60, contains two gyros oriented in such a way as to make all packages interchangeable and are mounted on a bulkhead of the aircraft 22. The gyro input axes are equally spaced on a cone as in FIGS. 3a–3c. The cone angle $\beta$ (which is shown as 77° in FIG. 3) is selected as a compromise between the following considerations:

(1) the maximum rate capability requirement for the gyros should be minimized. This improves the performance capability of the sensors;

(2) the simultaneous rate input along all vehicle control axes and the maximum individual rate input to each sensor should not exceed the maximum rate capability (range) of the gyros;

(3) the gyro errors should not be excessively amplified when gyro outputs are resolved to provide control information.

For example, let the simultaneous maximum rate inputs be 250°/sec, 40°/sec and 40°/sec along the roll, pitch and yaw axes, respectively. The maximum rate capability requirement of an individual gyro is minimized when $\beta$ approaches 90°. Under these circumstances, however, the outputs of the gyros have to be multiplied by large numerical values to resolve (determine) roll rates. This amplifies the gyro errors excessively. The selected angle is therefore a compromise between these two considerations. At $\beta=77°$ the maximum rate capability of an individual gyro need not exceed 109.5°/sec.

CONE-ANGLE OPTIMIZATION

The included angle $\beta$ of the conical surface which is defined by the sensor input axes must be optimized for the particular application. Optimization is in terms of three items:

(1) The maximum rates specified about the roll, pitch and yaw axes of the aircraft in which the system will be used;

(2) The relationship between the standard deviation of the sensor error and its maximum rate measuring capability; and (3) The amplification of the standard deviation of the sensor error that occurs when the skewed sensor outputs are resolved into rates about the aircraft roll, pitch and yaw axes.

Items 1 and 2 are combined to give an amplification factor, KR, associated with each of the aircraft axes. KR represents the change in the standard deviation of the sensor error as a function of the change in maximum rate measuring capability due to displacing the sensor input axes from the aircraft axes to the cone surface.

For the determination of KR it is necessary to determine the maximum rate imposed on the sensor input axes on the cone surface. In this orientation the sensor will produce an output in response to rotations about each of the three aircraft axes and its total output will be the sum of these three inputs. By taking the maximum roll, pitch and yaw rates that can occur simultaneously and assuming the maximum pitch and yaw rates are the same, the maximum rate imposed on a sensor can be obtained using relationship (1).

$$MSR = W_X \cos\beta + W_Y \sin 60° \sin\beta + W_Z \cos 60° \sin\beta \quad (1)$$

where $W_X$, $W_Y$, $W_Z$ are the maximum simultaneous rates that can occur about the aircraft roll, pitch and yaw axes respectively.

Figure 3:
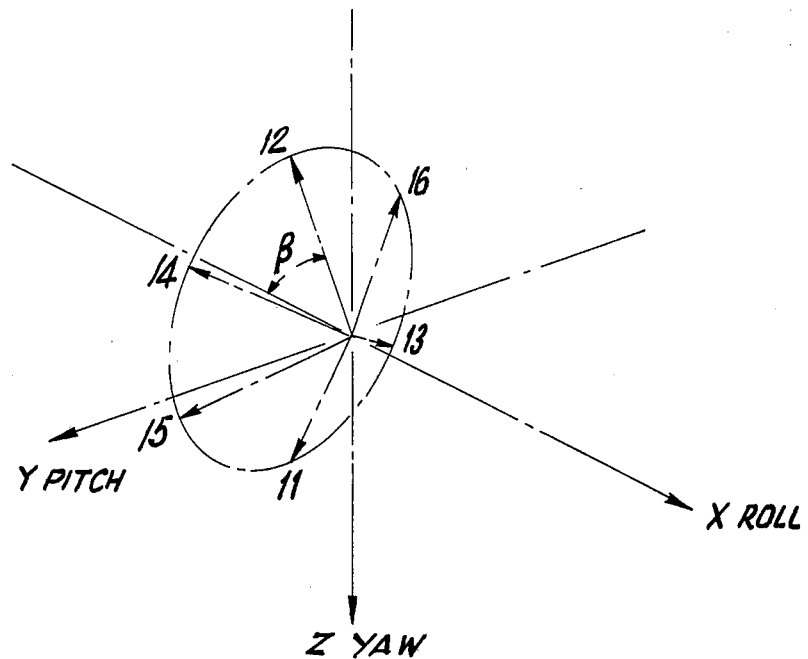
FIG. 3 is a schematic prespective view of the input axes of rate gyros.
Figures 3A, 3B:
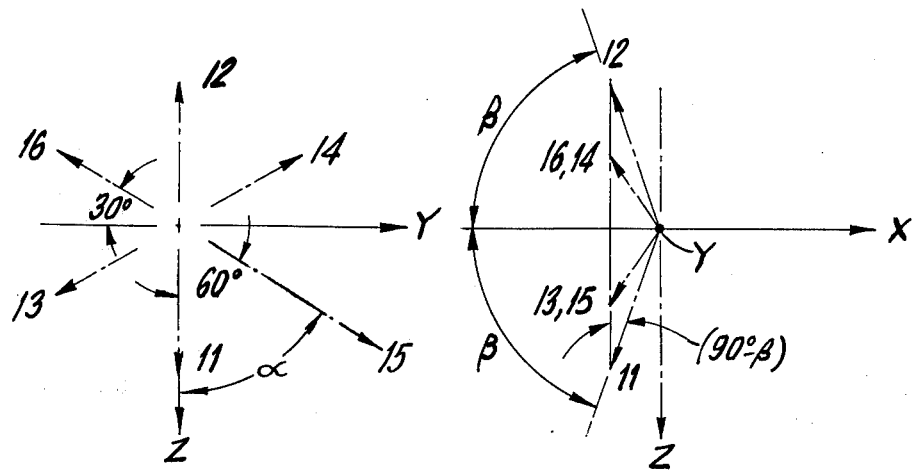
FIGS. 3a, 3b and 3c are views along the X, Y and Z axes, respectively of the rate gyros of FIG. 3.
Figure 3C:
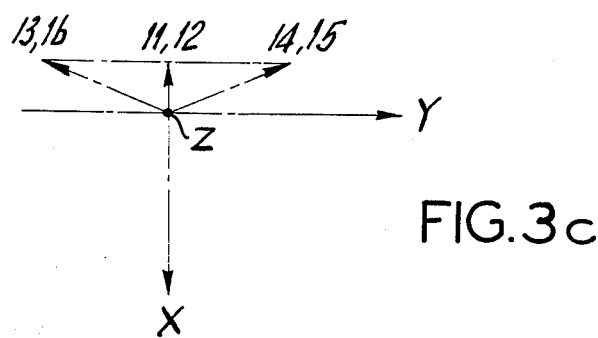

$\beta$ = half of the included cone angle, FIG. 3.

MSR = Maximum rate imposed on a sensor with its input axis on the cone.

To minimize the maximum value of MSR $\alpha$ takes the value of 30° or 60°. To implement the goal of providing a system with interchangeable gyros, the maximum rate measuring capability of all the gyros are set to this maximum value, MSR. With equal inputs along the pitch and yaw axes and equal spacing between the sensor input axes, the orientation of sensors on the cone, show in FIG. 3, minimizes the maximum rate imposed on the sensors, i.e., sensor 11 on the yaw axis or displaced ±30° therefrom.

As indicated above the standard deviation of the errors produced in the sensor output will be a function of the maximum rate measuring capability. This relationship is of the form:

$$KR_a = B\left(\frac{MSR}{MSR_a}\right)^C = \frac{\sigma}{\sigma_a} \quad (2)$$

where

B, C = numerical constants determined for the particular sensor. If the standard deviation varies linearly with maximum range, then B = C = 1.

MSR = Maximum rate measuring capability for the actual sensors with their input axis on the cone surface as determined by the above equation (1).

$MSR_a$ = Maximum rate measuring requirement for a virtual sensor if its input axis were along the "a" axis of the aircraft. This value is equal to the maximum rate specified for the aircraft about its "a" axis.

a = x, y, or z which designate the roll, pitch or yaw axes respectively.

$\sigma_a$ = Standard deviation of the errors of the virtual sensor aligned with the "a" aircraft axis.

$\sigma$ = Standard deviation of the errors of the actual sensor located on the surface of the cone.

$KR_a$ = Amplification factor along the "a" aircraft axis due to change of maximum rate measuring capability of gyros.

The third item results in an amplification of the standard deviation of the sensor error that is designated KS. It results from determining (or resolving) rates along the orthogonal roll, pitch and yaw axes using the outputs of the sensors located on the cone. When the output from a sensor on the cone is resolved, any error in the sensor output will also be resolved and will yield a corresponding error in the orthogonal components. The standard deviation of these errors changes as a function of $\beta$ and may be calculated by the following steps:

(1) Formulate the matrix B and evaluate each of its elements for the chosen angle, $\alpha = 60°$.

$$B = \begin{vmatrix} s\beta & 0 & c\beta \\ -s\beta & 0 & c\beta \\ s\beta c 60° & -s\beta s 60° & c\beta \\ -s\beta c 60° & s\beta s 60° & c\beta \\ s\beta c 60° & s\beta s 60° & c\beta \\ -s\beta c 60° & -s\beta s 60° & c\beta \end{vmatrix} \quad (3)$$

where c = cosine, s = sine (i.e., $s\beta = \sin\beta$)

(2) Calculate the elements of a matrix C $$C = (B^T B)^{-1} B^T \quad (4)$$

where $B^T$ is transpose of B and $(B^T B)^{-1}$ is the inverse of $(B^T B)$.

$$C = \begin{vmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \end{vmatrix}$$

(3) Calculate the KS factors as follows:

$$KS_x = (c_{31}^2 + c_{32}^2 + c_{33}^2 + c_{34}^2 + c_{35}^2 + c_{36}^2)^{\frac{1}{2}} \quad (5)$$

$$KS_y = (c_{21}^2 + c_{22}^2 + c_{23}^2 + c_{24}^2 + c_{25}^2 + c_{26}^2)^{\frac{1}{2}} \quad (6)$$

$$KS_z = (c_{11}^2 + c_{12}^2 + c_{13}^2 + c_{14}^2 + c_{15}^2 + c_{16}^2)^{\frac{1}{2}} \quad (7)$$

where the subscripts x, y, and z refer to the roll, pitch, and yaw axes respectively.

The total amplification factor for the standard deviation, KT, is the product KR and KS. For a particular aircraft axis "a"

$$KT_a = KR_a \cdot KS_a \quad (8)$$

where $KT_a$ is the total amplification factor for axis "a". "a" can be x, y, and z for the roll, pitch and yaw axes.

The optimum angle $\beta$, is the one at which the average total amplification factor, $KT_T$, is a minimum for a specified maximum roll, pitch and yaw rate and particular sensor design, where:

$$KT_T = \frac{KT_x + KT_y + KT_z}{3} \quad (9)$$

EXAMPLE

In the case of an advanced fighter/attack aircraft the individual maximum rate requirements could be:

roll ±250°/sec — $W_x$
pitch ±40°/sec — $W_y$
yaw ±40°/sec — $W_z$

Selecting $\alpha = 60°$ and optimizing $\beta$ to 77°, we find that the capacity of an individual gyro need not exceed 109.5°/sec.

DATA MANAGEMENT SYSTEM

Figure 4:
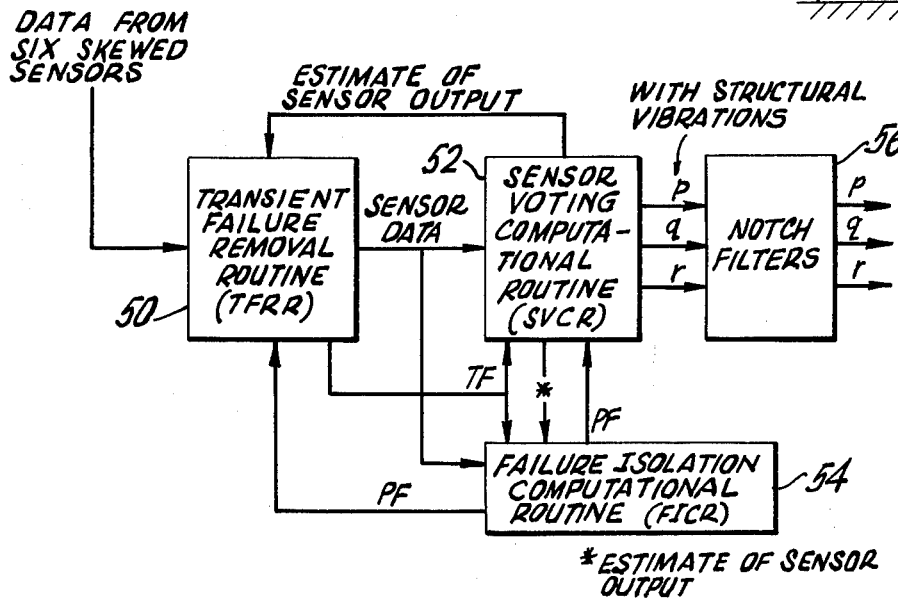
FIG. 4 is a schematic block diagram of a data management system for the present invention.

FIG. 4 describes the redundancy data management system designed to extract roll, pitch and yaw rate information from the cone configuration of skewed sensors. This system is assumed to be implemented in a digital computer. However, other means of implementation are possible. Signals from the sensors first enter the Transient Failure Removal Routine (TFRR) 50. The TFRR categorizes a sensor as Temporarily Failed (TF) if the latest value of the sensor output is unreasonable compared to the previous value of the estimate of the angular rate along the sensor axis. When a sensor is in the TF category its output cannot be used in subsequent calculations for one iteration cycle. At the completion of the TFRR operation signals from the remaining sensors simultaneously enter the Sensor Voting Computational Routine, (SVCR) 52 and the Failure Isolation Computational Routine (FICR) 54. The SVCR & TFRR use information generated within the FICR which indicates that a Permanent Failure (PF) of a sensor has occurred. When a sensor is placed in this category its output cannot be used to determine rate for all future iteration cycles. The SVCR provides angular rate signals along roll, pitch and yaw axis with the structural vibrations superimposed.

In operation the SVCR removes the poorest performing sensor from further computation and then resolves the information, obtained from the remaining sensors to provide roll, pitch and yaw signals. The SVCR computations are performed every cycle while the permanent failures generated within the FICR are determined only after a number of cycles are complete. In this way the control system can be provided with data which is free of transients and failed sensor outputs, at a high speed, and the FICR can function at a slower speed. The slow speed, nontime critical operation of the FICR improves the reliability of sensor failure identification because several iterations can be used to identify a failure, minimizing the number of false alarms and missed failures.

Notch filters 56 are used to attenuate the magnitude of the structural vibration inputs before the roll, pitch and yaw rate signals are passed to the control system. Only three signals are passed through the notch filters rather than six. This is possible because all the sensors are mounted on a rigid surface (one bulkhead) and are all sensing portions of the same three dimensional vibration input. If the vibration input to the sensors was not the same, all six sensor inputs would have to be filtered individually prior to entering the SVCR and FICR. Under these circumstances, the efficiency of the SVCR and FICR would be diminished because the residual vibration signals, that remain after notch filtering, are propagated into the SVCR and FICR equations.

Any skewed redundant sensor application, in which failure tolerance is desired, must rely on comparing data from all the sensors in such a way that failures may be detected. The techniques for failure detection are known in the art, e.g., the above-identified Weiss patent. The technique may be implemented in hardware or in the software of a digital computer.

In order for the failure detection scheme to accurately detect failures without incurring a large number of false alarms, it is desirable that the differences between sensor outputs caused by the vehicle bending mode dynamics be held to a minimum. In the present invention the differences are minimized by locating all sensors on a common aircraft bulkhead. The requirement, for combat survivability suggests dispersion of the sensors on this bulkhead. Manufacturing efficiency and ease of maintenance, on the other hand, suggest a consolidated installation—a single unit containing all sensors. The choice of duplicate two-packs, discussed below, dispersed on the periphery of the bulkhead is believed to be the optimum compromise between these opposing demands.

Figure 2:
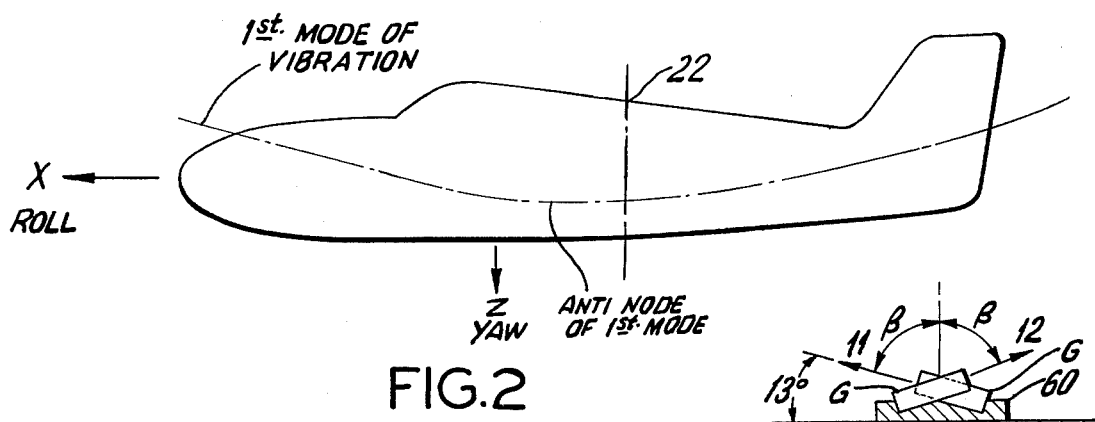
FIG. 2 is a side elevation view of an aircraft illustrating the first mode of vibration.
Figure 5:
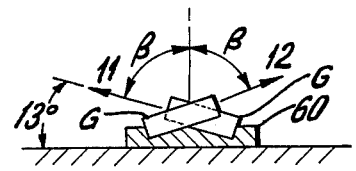
FIG. 5 is a cross-sectional view of a gyro two pack taken along line 5—5 in FIG. 1.

FIGS. 5 and 7 illustrate the configuration of a two-pack, 60. Each two-pack contains two identical sensors, G, with their input axes defining the surface of a cone having an included half-angle of 77°. The gyro two packs should be mounted on the aircraft bulkhead 22 in a plane perpendicular to the roll axis and aft of the anti node position of the first mode of vibration, as illustrated in FIG. 2, to minimize the effect of aircraft structural bending modes.

ALTERNATIVE ACCELEROMETER EMBODIMENT

Figure 8:
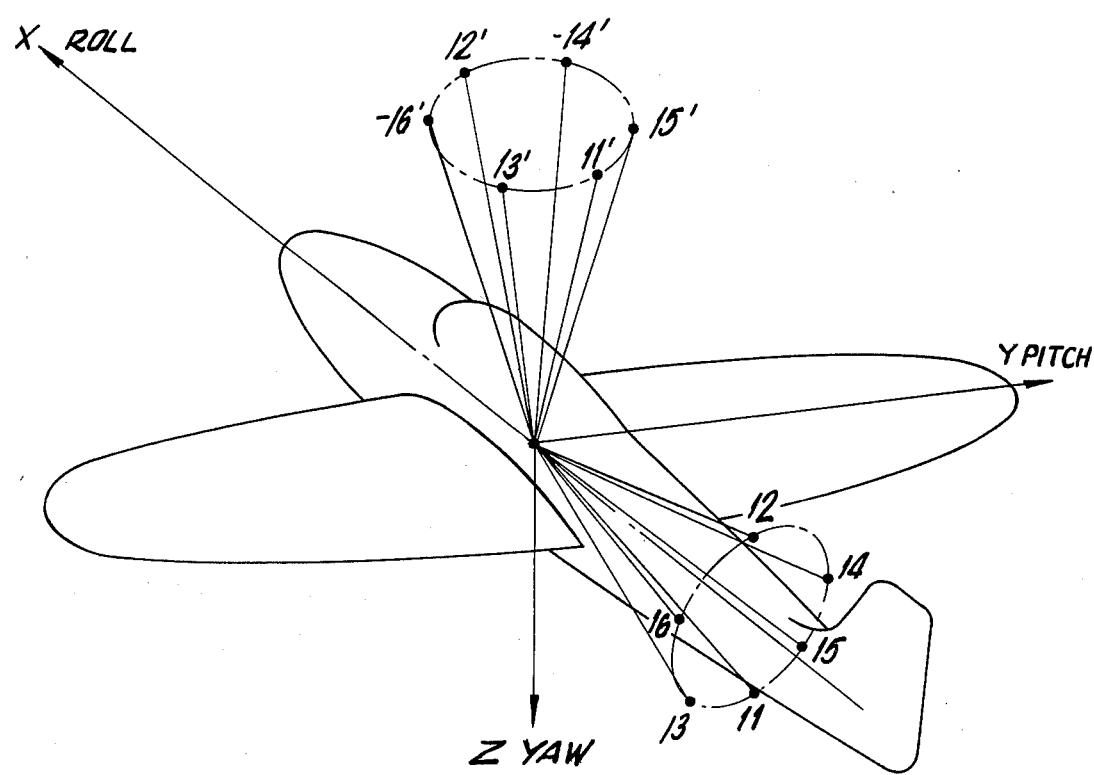
FIG. 8 is a perspective schematic view of an aircraft illustrating the relationship between the input axes of gyro and accelerometer cone configurations of the present invention.

An alternative configuration of the sensor system is shown in FIGS. 6 and 7. This configuration is applied to the flight control system translational accelerometers of an aircraft. It again makes use of interchangeable "two-packs" to meet survivability requirements. Each two pack, 60 contains two accelerometers with their input axes separated by $180° - 2\gamma$ or $2\beta'$ (see FIG. 7). The sensors are positioned on the bulkhead to form a conical shape defined by their input axis, 11', 12', 13',14', 15', and 16'. The relationship between the accelerometer input axes and the gyro input axes 11, 12, 13, 14, 15, 16 are shown in FIG. 8. In this arrangement the accelerometer system is configured to accept greater inputs along the aircraft Z axis (normal acceleration) then along X and Y, which are assumed to be equal, with the "two-packs" still being mounted on a common bulkhead so that they all sense the same structural bending mode inputs. In addition, the accelerometers are oriented so that their input axes pass through the axis of rotation of torsional vibrations (roll axis). This constraint prevents the rotational acceleration signals caused by torsional vibrations from degrading the performance of the failure detection scheme and minimizes errors caused by aircraft angular acceleration about the roll axis. As discussed above with respect to gyro orientation, the accelerometers are at equally spaced [at 60°]intervals (symmetric) on the cone surface and accelerometers 11' and 12' are located in the X-Z plane.

The specific embodiment shown permits the maximum normal acceleration to be twice that along the other axes. This is due to the angle, $\gamma$, being $\text{Tan}^{-1}(0.5)$. It should be noted that $\gamma = \text{Tan}^{-1}(0.5)$, about 26° 34', is the only possible solution to the problem of using interchangeable two-packs in a conical, symmetric six sensor array when the axis of the cone lies parallel to the bulkhead on which the accelerometers are to be mounted, and the accelerometer axes must intersect the roll axis.

Through cyclic permutation, it will be observed that the maximum acceleration imposed on the accelerometers, assuming that the longitudinal and lateral (X, Y axes) acceleration is the same, may be obtained from the generalized form of equation (1):

$$MSR' = A_x \cos \beta' + A_y \sin(90-\phi) \sin \beta' + A_z \cos(90-\phi) \sin \beta' \quad (1')$$

where $A_x$, $A_y$, $A_z$ are the maximum simultaneous accelerations that can occur along the x, y, and z axes; $\beta'$ is the half included cone angle and $\phi$ is the half angle separation between the sensor input axes projected on a plane perpendicular to the cone axis. For symmetrically spaced sensors, FIG. 6, $\phi = 30°$.

Similarly the B' matrix is of the form:

$$B' = \begin{vmatrix} -c\beta' & 0 & -s\beta' \\ -c\beta' & 0 & s\beta' \\ -c\beta' & -c\alpha s\beta' & -s\alpha s\beta' \\ -c\beta' & -c\alpha s\beta' & -s\alpha s\beta' \\ -c\beta' & c\alpha s\beta' & -s\alpha s\beta' \\ -c\beta' & c\alpha s\beta' & -s\alpha s\beta' \end{vmatrix} \quad (3')$$

Figure 9:
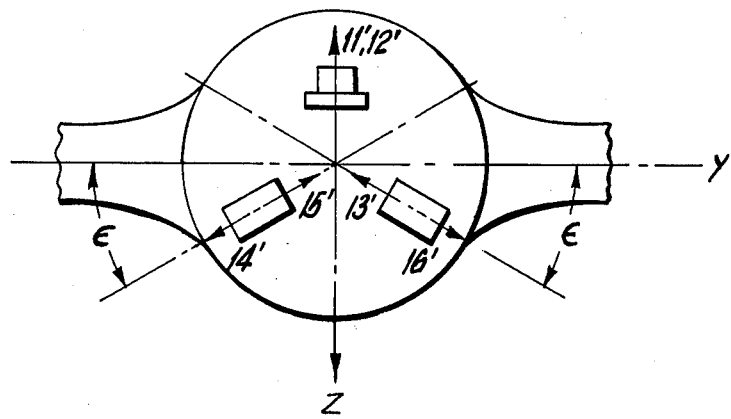
FIG. 9 is a schematic sectional view similar to FIG. 6 in which the input axes of the sensors are unevenly spaced about the cone surface.
Figure 10:
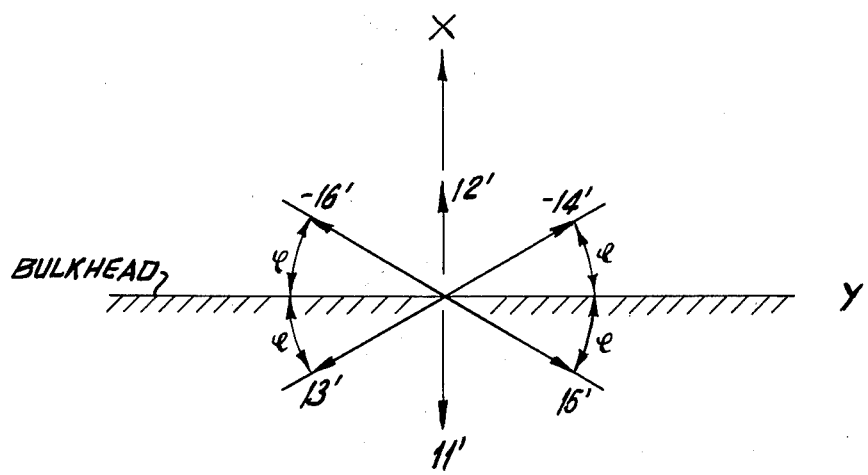
FIG. 10 is a view taken along the Z axis of the sensor configuration shown in FIG. 9.

A more generalized embodiment, using interchangeable two-packs in a conical, non-symmetric six accelerometer array with the axis of the cone parallel to the bulkhead on which the accelerometers are to be mounted, with accelerometers 11' and 12' in the X-Z plane and with the accelerometer axes intersecting the roll axes, is shown in FIGS. 9 and 10. With this embodiment the maximum normal acceleration can be more or less than twice that along the other two axes and $\epsilon = \phi - \sin^{-1}(\tan\gamma)$. Recalling that $\gamma = 90 - \beta'\epsilon$ and the maximum acceleration measurement capability. $\gamma$ and $\epsilon$ are adjusted to account for the difference between expected normal and lateral/longitudinal acceleration and to minimize the average total amplification factor.

What is claimed is:

1. A vector sensing system for measuring triad rates or accelerations of an aircraft comprising six identical vector sensors, each sensor having a predetermined input axis; means for mounting said sensors in said aircraft with their input axes arranged in a non-orthogonal relationship relative to one another and with their input axes defining the surface of a cone having its axis coincident with the axis of maximum input to the aircraft, said cone having a central half angle such that an average total amplification factor is minimum; and a data management means responsive to the output signals of said sensors to resolve said outputs into aircraft axes rates or accelerations.

2. A system of claim 1, wherein said means for mounting includes means for mounting the six sensors in three packages each containing two sensors.

3. A system of claim 2, wherein each package is identical.

4. A system of claim 2, wherein said packages are mounted on a common bulkhead of said aircraft to minimize the effect of bending of the aircraft.

5. A system of claim 1, wherein said sensors are each oriented with their input axes symmetrically spaced on the surface of said cone.

6. A system of claim 5, wherein two of said sensors input axes are coplanar with the plane defined by the yaw and roll axes.

7. A system of claim 6, wherein said vector sensors are rate sensors whose input axes are arranged to define a cone having a half angle of 77°.

8. A system of claim 6, wherein said vector sensors are accelerometers; and the half angle of the cone is about 63° 26'.

9. A system of claim 5, wherein one of said sensor axis lies in a plane displaced 30° from the yaw-roll plane.

10. A method of measuring triad rates or accelerations in an aircraft in which the maximum rate requirements about the axes of the aircraft differ which comprises the steps of: providing six vector sensors having identical maximum rate capacities; positioning the sensors with their input axes defining a cone having its axes coincident with the axis of maximum input to the aircraft, said cone having a central half angle selected to minimize the average total amplification factor; and utilizing the output of said sensors to resolve the rates or accelerations along the roll, pitch and yaw axes.

11. A method of claim 10 including the steps of arranging the six rate sensors in three packages containing two sensors each.

12. A method of claim 10, wherein said sensors are each symmetrically spaced on the surface of said cone.

13. A method of claim 12, wherein said sensors are gyroscopes and said cone axis is coincident with the roll axis.

14. A method of claim 13, wherein the central half angle is 77°.

15. A method of claim 13, including the steps of mounting said sensors on a common bulkhead located aft of the anti node of the first mode of vibration of the aircraft.

16. A method of claim 12, wherein said sensors are accelerometers and said cone axis is coincident with the yaw axis.

17. A method of claim 16, wherein the central half angle is about 63° 26'.

18. A vector sensing system for measuring triad rates or accelerations of an aircraft comprising six identical vector sensors, each sensor having a pre-determined input axis; means for mounting said sensors in said aircraft with their input axes arranged in a non-orthogonal relationship relative to one another and with their input axes defining the surface of a cone having its axis coincident with the axis of maximum input to the aircraft, said cone having a central half angle such that an average total amplification factor is minimum.

19. A system of claim 18, wherein said means for mounting includes means for mounting the six sensors in three packages each containing two sensors.

20. A system of claim 19, wherein each package is identical.

21. A system of claim 19, wherein said packages are mounted on a common bulkhead of said aircraft to minimize the effect of bending of the aircraft.

22. A system of claim 18, wherein said sensors are each oriented with their input axes symmetrically spaced on the surface of said cone.

23. A system of claim 22, wherein two of said sensor input axes are coplanar with the plane defined by the yaw and roll axes.

24. A system of claim 23, wherein said vector sensors are rate sensors whose input axes are arranged to define a cone having a half angle of 77°.

25. A system of claim 23, wherein said vector sensors are accelerometers; and the half angle of the cone is about 63° 26'.

26. A system of claim 22, wherein one of said sensor axis lies in a plane displaced 30° from the yaw-roll plane.

27. A system of claim 22, wherein said sensors are gyroscopes and said cone axis is coincident with the roll axis.

28. A system of claim 26, wherein said sensors are mounted on a common bulkhead located aft of the antinode of the first mode of vibration of the aircraft.

29. A system of claim 22, wherein said sensors are accelerometers and said cone axis is coincident with the yaw axis.

* * * * *